United States Patent

Paroz et al.

[11] Patent Number: 5,583,388
[45] Date of Patent: Dec. 10, 1996

[54] DEVICE FOR HOLDING THE ENDS OF THE TURNS OF A STATOR WINDING IN A DYNAMOELECTRIC MACHINE

[75] Inventors: José-Pierre Paroz, Yverdon; Hans Zimmermann, Mönchaltorf, both of Switzerland

[73] Assignee: ABB Management AG, Baden, Switzerland

[21] Appl. No.: 266,714

[22] Filed: Jun. 28, 1994

[30] Foreign Application Priority Data

Jul. 5, 1993 [DE] Germany ............... 43 22 269.2

[51] Int. Cl.⁶ ................................................. H02K 3/46
[52] U.S. Cl. ............................................... 310/260
[58] Field of Search ................................. 310/194, 260, 310/270

[56] References Cited

U.S. PATENT DOCUMENTS

| | | | |
|---|---|---|---|
| 3,436,580 | 4/1969 | Brennan et al. | 310/260 |
| 3,988,625 | 10/1976 | Jager et al. | 310/260 |
| 4,238,339 | 12/1980 | Khutoretsky et al. | 310/260 |
| 4,318,021 | 3/1982 | Johansson et al. | 310/260 |
| 4,488,079 | 12/1984 | Dailey et al. | 310/260 |
| 4,800,314 | 1/1989 | Ward et al. | 310/260 |
| 5,051,642 | 9/1991 | Hediger et al. | 310/260 |
| 5,140,740 | 8/1992 | Weigelt | 310/260 |

FOREIGN PATENT DOCUMENTS

| | | |
|---|---|---|
| 0432720 | 6/1991 | European Pat. Off. . |
| 1197971 | 8/1965 | Germany ............... 310/260 |
| 1613125 | 1/1971 | Germany . |
| 1021407 | 3/1966 | United Kingdom ....... 310/260 |
| 1127916 | 9/1968 | United Kingdom ....... 310/260 |
| 1289829 | 9/1972 | United Kingdom ....... 310/260 |

*Primary Examiner*—Clayton E. LaBalle
*Attorney, Agent, or Firm*—Oblon, Spivak, McClelland, Maier & Neustadt, P.C.

[57] ABSTRACT

The device for holding the ends of the turns of a stator winding in a dynamoelectric machine comprises an inner ring (15) and a segmented outer ring (10). The stator winding, which consists of bottom and top bars (5, 6), is supported at the end side on the said outer ring (10), which in turn is supported by brackets (8) which are fastened to the machine end face. The bottom and top bars are spaced from one another by pressure hoses (13) filled with synthetic resin. The inner ring (15) consists of two rings having a closed inner conical ring (15b), an outer, preferably multi-partite conical ring (15a) and support segments (15c), it being possible for the two conical rings to be braced axially with one another. A winding overhang support constructed in such a way fulfils all practical requirements and can also be reclamped subsequently.

14 Claims, 2 Drawing Sheets

5,583,388

DEVICE FOR HOLDING THE ENDS OF THE TURNS OF A STATOR WINDING IN A DYNAMOELECTRIC MACHINE

BACKGROUND OF THE INVENTION

1. Field of the Invention

The invention relates to a device for holding the ends of the turns of a stator winding in a dynamoelectric machine, comprising a rotor and a stator, which stator has a laminated core with end-side stator core end plates, there being arranged in the laminated core in slots a stator winding which has bottom and top bars and whose ends overlap the laminated core axially, which holder has an inner ring which fits closely, directly or with the inclusion of a separator, against the ends of the turns of the stator winding, which ends expand like an internal taper, and which has a multipartite external support which is supported on the end face of the laminated core.

In this regard, the invention refers to a prior art such as follows, for example, from EP-A-0,432,720, or U.S. Pat. No. 5,140,740, which has the same tenor.

2. Discussion of Background

Fastening the ends of the turns of the stator windings (winding overhang) of turbo-generators is attended by certain problems because of the high loads to which these winding overhangs are exposed. The origin of these loads lies in electromagnetic force effects, in particular in the case of short circuiting, in vibration phenomena and in different thermal expansions of the stator bars with respect to the stator iron during operation. These loads lead sooner or later to instances of loosening and wear phenomena, which lead in the end to earth shorts and short circuits.

In order to improve the strength of the winding overhangs of large electric machines, a series of systems have been introduced, the majority of which operate using single-part rings made from insulating material as the central support element.

In the device for holding the ends of the turns of a stator winding in an electric machine according to DE-OS 1,613,125, an outer ring fits closely from outside against a portion of the external layers of the ends of the turns. An inner ring which is independent of the outer ring engages on the inner layers of the ends of the turns. In order to prevent mutual axial displacement of the two rings, provision is made of devices which are constructed as C-shaped bows and embrace the ends of the turns so that the two bows are joined. The two rings are screwed by means of axially extending holders which, for their part, are fastened to the end face of the stator laminated core.

The winding overhang holder according to U.S. Pat. No. 4,800,314 uses only one outer ring. The winding overhang ends are wedged and bonded with respect to one another in groups and are fastened to this outer ring by means of bands.

A further solution, provided in particular for retrofitting, of the support problem is the subject-matter of U.S. Pat. No. 5,140,740 or EP-A-0,432,720, which has the same tenor. The holder proposed there has an inner ring which fits closely against the ends of the turns of the stator winding, which ends expand like an internal taper. The external support consists of an at least bipartite ring, or of supporting beams which extend in the circumferential direction and are interconnected. Tie bolts, which engage on the inner ring and outer ring or the supporting beams, serve to brace the inner ring and external support. Alternatively, the outer ring and the tie bolt can be omitted (FIG. 4) in what is known. Together with the end bows of the winding overhang, the inner ring is then supported, with the interposition of chucking wedges, on angles which are fastened on the end face of the stator laminated core.

It is disadvantageous in both alternatives that they can be reclamped in the case of instances of loosening of the winding overhang unit only by means of a high outlay.

SUMMARY OF THE INVENTION

Accordingly, one object of the invention is to provide a novel holder of the species named at the beginning, which can be produced economically and simply, reliably withstands all the operating loads of the said type and, in particular, can be reclamped after any instances of loosening in the winding overhang unit. Moreover, in the case of servicing and maintenance work and, in particular, during retrofit work the holder is both to be easy to mount and likewise simple to remove again.

This object is achieved according to the invention when the external support has a multipartite outer ring consisting of ring segments detachably connected to one another, the ring segments are partially situated at the free end of the brackets in slots which extend in the circumferential direction and are aligned with one another, means for spacing bottom and top bars are provided, the inner ring consists of a closed inner conical ring, a single-part or multipartite outer conical ring and support segments, the conical surfaces on the two conical rings extending in the direction of the ends of the turns of the stator winding, which ends expand like an internal taper, and the two conical rings can be braced axially against one another.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
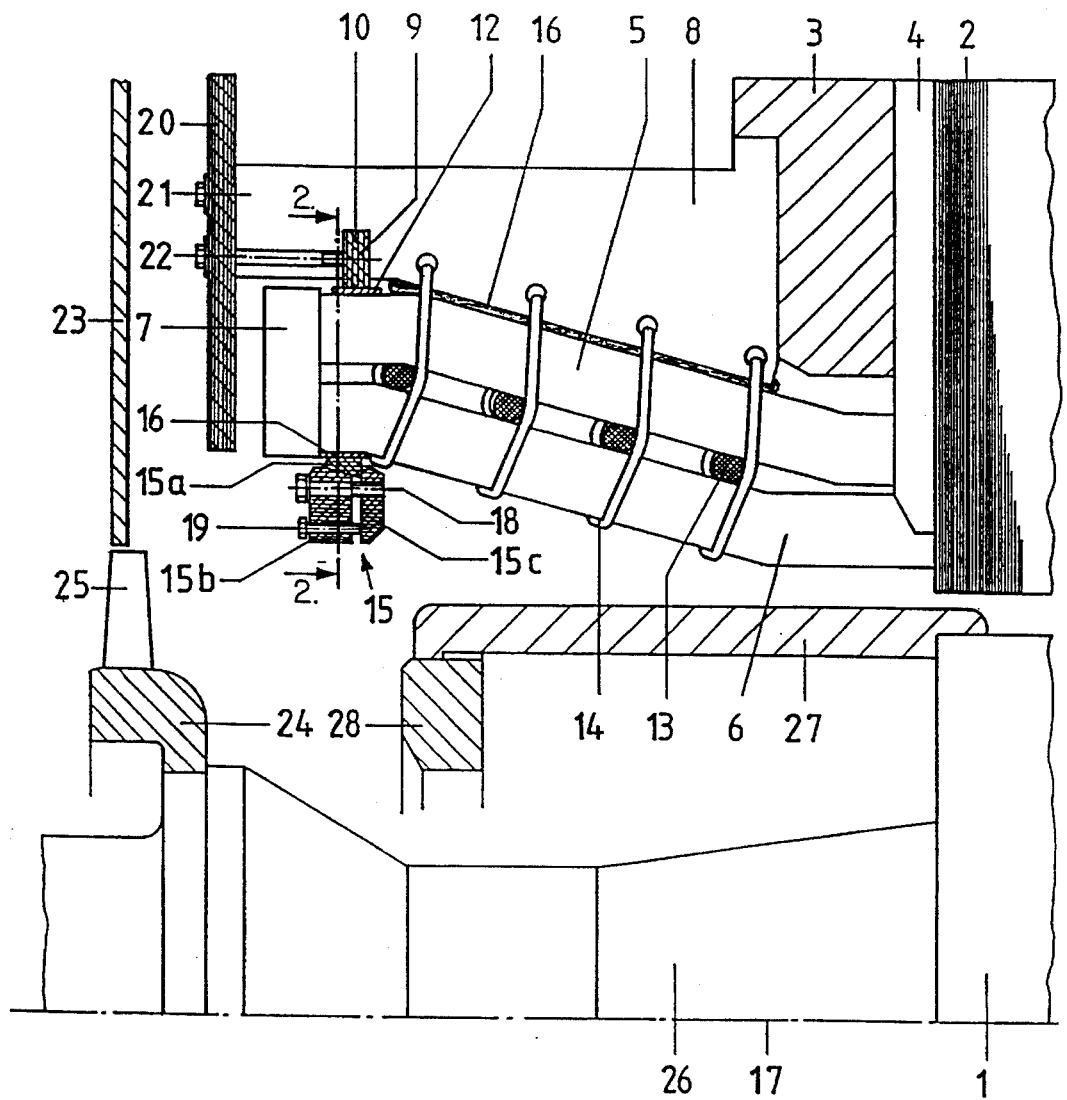
FIG. 1 shows a simplified longitudinal section through the LV end part of a turbo-generator.

Referring now to the drawings, wherein like reference numerals designate identical or corresponding parts through the several views, in the simplified longitudinal section through the front end part (NS end or exciter end) of a turbo-generator in accordance with FIG. 1, the reference numeral 1 denotes a rotor, 2 a stator laminated core, 3 its core end plate and 4 a press finger. The stator winding consists of a bottom bar 5 and a top bar 6, whose ends projecting from the stator laminated core 2, the so-called end bows, are connected to one another electrically and mechanically by means of eyes 7. The totality of all the end bows forms the winding overhang.

Figure 2:
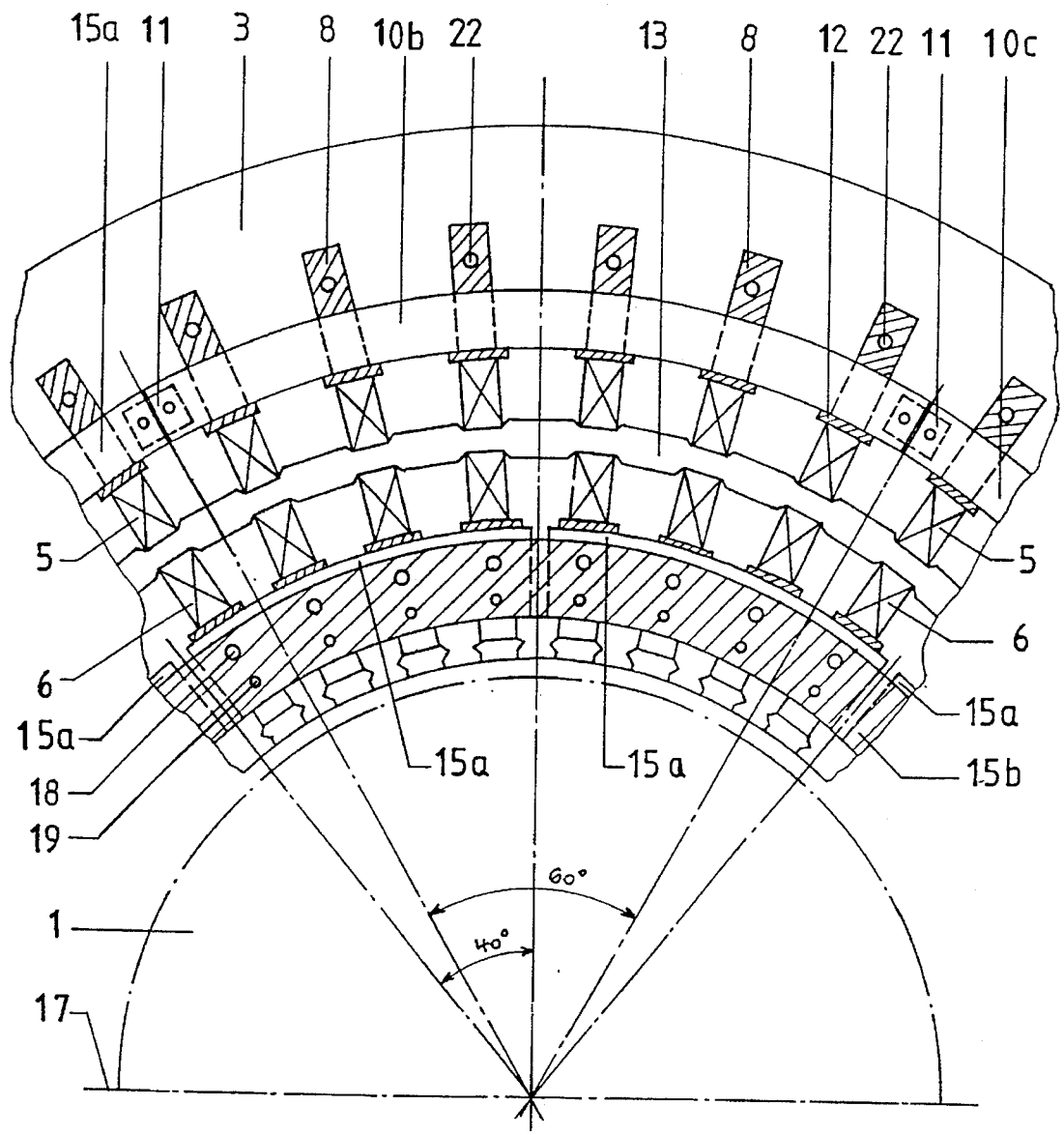
FIG. 2 shows a partial radial section through the end part of the turbo-generator in accordance with FIG. 1 at the level of the internal support along the line AA thereof.

Brackets 8 fastened on the stator core end plate 3 are provided for external support of the winding overhang. This way slots 9 aligned in the circumferential direction in the end region. The slots extend orthogonally relative to the longitudinal axis of the machine and are open radially inwardly. A multipartite ring made from insulating material, termed the outer ring 10 below and consisting of segments 10a, 10b, 10c . . . (FIG. 2) overlapping 60° in the exemplary case, is inserted into these slots 9. The individual segments are detachably interconnected, for example by means of links 11.

The bottom bars 5 of the stator winding are supported on the outer ring 10 with the interposition of insulating separators 12, for example made from glass-fiber mat or chopped strand mat. In the exemplary case, four pressure hoses 13 which are filled with synthetic resin and made from insulating material and whose function will be explained in more detail later are drawn in between the bottom and top bars 5 and 6, respectively, in a manner distributed uniformly over the axial projection of the winding overhang. Together with the pressure hoses 13, the bottom and top bars are fastened to the brackets 8 by means of glass fiber strands 14 or glass fiber rovings.

The internal support is performed by means of an inner ring arrangement denoted in general by the reference numeral 15. The latter consists essentially of three assemblies or elements: a multipartite outer conical ring 15 consisting of conical ring segments 15a, a closed inner conical ring 15b and support segments 15c. An insulating separator 16, made from chopped strand mat, for example, is provided between the bearing surface on the top bar 6 and the bearing surface on the inner conical ring 15a.

The radially inward conical surface of the outer conical ring 15a and the radially outward conical surface of the inner conical ring 15b extend approximately in the direction of the top bars 6, which expand like an internal taper. The support segments 15c are supported on the end face, extending approximately orthogonally relative to the longitudinal axis 17 of the machine and facing the machine interior, of the outer conical ring 15a. Clamping bolts 18 which are screwed into corresponding threaded bores in the support segments 15c can be used to brace the inner conical ring 15b against the outer conical ring 15a in the axial direction. Setscrews 19 which bear against the support segments 15c and are screwed into the inner conical ring 15b can be used to prevent the inner conical ring 15b from twisting.

When the inner and outer conical rings are clamped together, impermissibly high tensile stresses can occur on the stator laminated core 2 (laminated from sheet metal) via the outer ring 10 and the brackets 8. In order to absorb these forces, provision is made of a single-part annular plate 20 made from insulating material, which is fastened by means of bolts 21 to all the brackets 8. Further bolts 22 are guided in the brackets 8 through axially extending bores reaching as far as the slots 9, and are bolted there to the outer ring 10.

For reasons of completeness, the outer seal 23 of the winding overhang space and the axial fan 24 mounted with its blades 25 on the rotor 1 are illustrated in FIG. 1, as are the rotor shaft 26, rotor cap 27 and its cap plate 28.

The production of the winding overhang unit is accomplished in the following way:

Before the insertion of the stator winding bars 5, 6, the segments 10a, 10b, 10c, . . . are inserted into the slots 9 and connected to the outer ring by means of the links 11. After the insertion of the bars, the pressure hoses 13 are drawn in and the glass fiber strands 14, impregnated previously or after installation with curable synthetic resin, are fitted. Thereafter, the annular plate 20 is fastened to the brackets 8, and at the same time the outer ring 10 is fastened by means of the bolts 22. The inner ring 15 is subsequently inserted and prestressed. The pressure hoses 13 are then filled with curable impregnating resin, for example epoxy resin, and pressurized, and the impregnating resin is cured under pressure. During the process, the pressure hoses 13 assume the exaggerated configuration illustrated in FIG. 2, that is to say they inflate in the spacings between adjacent conductor bars 5 and 6, respectively, and thereby ensure fixing and spacing in the circumferential direction. At the same time, they press the bottom and top bars apart and thereby stiffen the winding overhang unit in the radial direction. The brackets 8 and the annular plate 20, and also the outer ring 10, in this case absorb forces acting radially outwards, while the inner ring 15 absorbs forces acting radially inwards. Instead of pressure hoses 13 which overreach the entire circumference, it is also possible to use shorter lengths of hose or, in the limiting case, cushions filled with synthetic resin. It is essential that these elements, which have support and spacing functions in later operation, principally serve to brace the winding overhang unit in the course of assembly. After curing of the synthetic resin and the shrinkage which occurs in a virtually unavoidable fashion in this case, the inner conical ring 15b is braced against the outer conical segments 15a and the entire winding overhang is finally strengthed in this way.

An alternative mode of procedure consists in performing spacing with the aid of "conventional" glass fiber rovings or glass fiber strands, which are drawn in dry and thereafter impregnated with curable synthetic resin or are already impregnated with curable synthetic resin and are then installed, and only then bracing the winding overhang with the inner ring 15.

If instances of loosening should occur in the winding overhang unit in later operation, these can be removed without a high outlay by reclamping the inner ring 15.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for holding the ends of the turns of a stator winding in a dynamoelectric machine, comprising a rotor and a stator, which stator has a laminated core with end-side stator core end plates, there being arranged in the laminated core a stator winding whose ends overlap the laminated core axially, which holder has an inner ring which fits closely against the ends of the turns of the stator winding, which ends expand like an internal taper, and which has a multipartite external support which is supported by brackets on the end face of the laminated core, wherein the external support has a multipartite outer ring consisting of ring segments detachably connected to one another, the ring segments are partially situated at the free end of the brackets in slots which extend in the circumferential direction and are aligned with one another, means for spacing bottom and top bars are provided, the inner ring consists of a closed inner conical ring, a single-part or multipartite outer conical ring and support segments, conical surfaces on the two conical rings extending in the direction of the ends of the turns of the stator winding, which ends expand like an internal taper, and the two conical rings can be braced axially against one another.

2. The device as claimed in claim 1, wherein all the brackets are connected to a common annular plate which extends orthogonally relative to the longitudinal axis of the machine and is detachably fastened to the free end faces of the brackets.

3. The device as claimed in claim 2, wherein the ring segments of the outer ring are also bolted to the annular plate.

4. The device as claimed in claim 1, wherein pressure hoses which are filled with curable synthetic resin for the purpose of support and mutual spacing of the stator winding conductors are drawn into the spacings between the bottom and top bars.

5. The device as claimed in claim 2, wherein pressure hoses which are filled with curable synthetic resin for the purpose of support and mutual spacing of the stator winding conductors are drawn into the spacings between the bottom and top bars.

6. The device as claimed in claim 3, wherein pressure hoses which are filled with curable synthetic resin for the purpose of support and mutual spacing of the stator winding conductors are drawn into the spacings between the bottom and top bars.

7. The device as claimed in claim 1, wherein glass fiber strands or glass fiber rovings which are impregnated with curable synthetic resin for the purpose of support and mutual spacing of the stator winding conductors are drawn into the spacings between the bottom and top bars.

8. The device as claimed in claim 2, wherein glass fiber strands or glass fiber rovings which are impregnated with curable synthetic resin for the purpose of support and mutual spacing of the stator winding conductors are drawn into the spacings between the bottom and top bars.

9. The device as claimed in claim 3, wherein glass fiber strands or glass fiber rovings which are impregnated with curable synthetic resin for the purpose of support and mutual spacing of the stator winding conductors are drawn into the spacings between the bottom and top bars.

10. The device as claimed in claim 1, wherein the two conical rings can be braced axially against one another by means of clamping bolts and setscrews, it being possible to screw the clamping bolts into the support segments, and the setscrews being supported on the outwardly directed end faces of the said support segments.

11. The device as claimed in claim 2, wherein the two conical rings can be braced axially against one another by means of clamping bolts and setscrews, it being possible to screw the clamping bolts into the support segments, and the setscrews being supported on the outwardly directed end faces of the said support segments.

12. The device as claimed in claim 3, wherein the two conical rings can be braced axially against one another by means of clamping bolts and setscrews, it being possible to screw the clamping bolts into the support segments, and the setscrews being supported on the outwardly directed end faces of the said support segments.

13. The device as claimed in claim 4, wherein the two conical rings can be braced axially against one another by means of clamping bolts and setscrews, it being possible to screw the clamping bolts into the support segments, and the setscrews being supported on the outwardly directed end faces of the said support segments.

14. The device as claimed in claim 5, wherein the two conical rings can be braced axially against one another by means of clamping bolts and setscrews, it being possible to screw the clamping bolts into the support segments, and the setscrews being supported on the outwardly directed end faces of the said support segments.

* * * * *